United States Patent [19]

Sato et al.

[11] Patent Number: 4,593,335
[45] Date of Patent: Jun. 3, 1986

[54] PRESSURE PAD DEVICE FOR A MAGNETIC TAPE CASSETTE

[75] Inventors: Takateru Sato; Haruo Shiba, both of Tokyo, Japan

[73] Assignee: TDK Corporation, Tokyo, Japan

[21] Appl. No.: 513,347

[22] Filed: Jul. 13, 1983

[30] Foreign Application Priority Data

Aug. 2, 1982 [JP] Japan .................... 57-116250[U]

[51] Int. Cl.⁴ .................................... G11B 23/02
[52] U.S. Cl. .................... 360/130.33; 360/132; 242/199
[58] Field of Search ......... 360/130.33, 130.3, 130.31, 360/130.32; 242/199

[56] References Cited

U.S. PATENT DOCUMENTS

| | | | |
|---|---|---|---|
| 3,682,482 | 8/1972 | Zwetzig et al. | 360/130.33 |
| 4,078,742 | 3/1978 | Steipe | 360/130.33 X |
| 4,102,514 | 7/1978 | Ito | 242/199 |
| 4,205,809 | 6/1980 | Lau | 242/199 |
| 4,288,826 | 9/1981 | Sato | 360/130.33 |

Primary Examiner—John H. Wolff
Attorney, Agent, or Firm—Oblon, Fisher, Spivak, McClelland & Maier

[57] ABSTRACT

A pressure pad device for a magnetic tape cassette comprises a leaf spring having a central fulcrum portion, left and right side portions extending symmetrically from the central fulcrum portion, and each pad attached to each near end of the left and right side portions so as to be equidistant from the central fulcrum portion. A fitting hole is formed at the central fulcrum portion by bending alternately a plurality of strip zones formed in the central fulcrum portion of the leaf spring inwardly and outwardly. The fitting hole is adapted to receive a supporting pole of the magnetic tape cassette and each end of the left and right side portions of the leaf spring is flexibly in contact with each supporting of the magnetic tape cassette.

6 Claims, 15 Drawing Figures

FIGURE 1 *PRIOR ART*
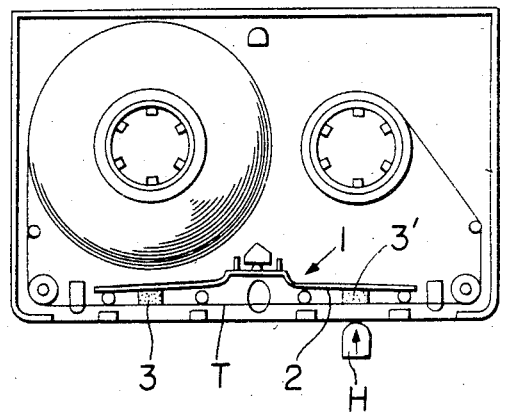
FIGURE 2 *PRIOR ART*
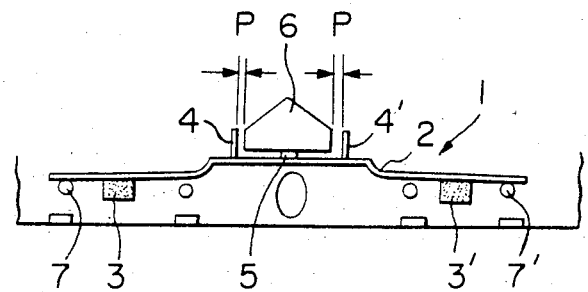

FIGURE 7(a)   FIGURE 7(b)   FIGURE 7(c)
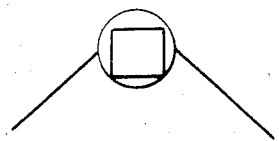 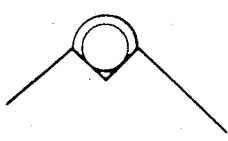 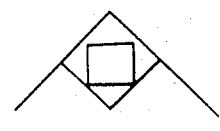
FIGURE 7(d)
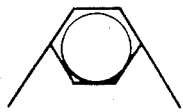

PRESSURE PAD DEVICE FOR A MAGNETIC TAPE CASSETTE

BACKGROUND OF THE INVENTION

1. Field of the Invention

The present invention relates to a pressure pad device used for a magnetic tape cassette. More particularly, it relates to a pressure pad device provided with a central fulcrum structure for eliminating a clattering movement of a pad as found in the conventional pressure pad device.

2. Description of the Related Art

In general, a magnetic tape cassette is provided with a pressure pad device comprising a leaf spring and a pad which forces a magnetic tape to a magnetic recording-/reproducing head. In a magnetic tape microcassette, a pad is attached to each left and right side portions of a leaf spring at a symmetrical position. This is because a magnetic head is provided at a position apart from the center of a recorder for a microcassette for the reason of requirement in design and accordingly, it is necessary to provide separately pads for the side A and side B of the microcassette. When the microcassette is set in a recorder to use the side A, one of the pads opposes the magnetic head and when it is reversed to use the side B, the other pad opposes the head. Thus, there has been used a pressure pad device constructed in such a mannger that the center of a leaf spring is supported by a supporter formed in the cassette and each pad is attached to near each end of the left and right side portions of the leaf spring at a symmetrical position with respect to the center of the leaf spring.

An example of the conventional pressure pad device will be described with reference to drawing. FIG. 1 is a plan view of a magnetic tape microcassette. A pressure pad device 1 is placed at the central portion on the front side of the microcassette and just inside a magnetic tape T running through the front side of the microcassette. The pressure pad device 1 comprises a leaf spring 2 made of a single piece of a material and pads 3, 3' attached respectively to each end portion of the leaf spring 2 at a symmetrical position with respect to the center of the spring. The leaf spring is formed by bending a flexible, thin metallic plate such as phosphor bronze so that left and right portions of the leaf spring are made symmetric with respect to its center. The pads 3, 3' are generally made of felt and are bonded to the leaf spring. When the microcassette is put in the recorder, a pad is opposed to a magnetic head H through the magnetic tape, depending on whether the side A or the side B of the microcassette is used. (The pad 3' is used in the embodiment shown in FIG. 1.) The head slightly forces the magnetic tape to bring it in press-contact with the front surface of the pad with the result that the leaf spring is slightly deflected rearwards. The magnetic tape is moved between the head and the felt pad in contact therewith and under a slightly curved condition to be subjected to a predetermined operation such as recording or reproducing.

FIG. 2 is an enlarged view of the pressure pad device shown in FIG. 1. The leaf spring 2 has a central portion having a pair of projecting pieces 4, 4' which extend along both side surfaces of a supporting member 6 formed integrally on the microcassette. By engaging the supporting member with the projecting pieces, the leaf spring 2 is supported by the supporting member 6. A center projection 5 is formed at the center of the leaf spring to contact to the supporting member 6. Both ends of the leaf spring 2 are respectively forced to supporting pins 7, 7' in a flexible manner.

FIGS. 3(a) and 3(b) respectively show a plan view and a front view of a second embodiment of the conventional pressure pad device. The pressure pad device shown in FIG. 3 is the same as that in FIG. 2 except for the central fulcrum structure. Namely, an enlarged portion 10 is formed at the center of the leaf spring 2 and the enlarged portion is engaged with each pair of protrusions 11 formed on the inner surfaces of upper and lower half casings of the microcassette whereby the leaf spring is placed in a right position.

FIGs. 4(a) and 4(b) show a third embodiment of the conventional pressure pad device. In this case, a recess 12 formed both sides of the central enlarged portion 10 of the leaf spring 2 and protrusions 13 formed on the upper and lower half casings of the microcassette are respectively fitted into the recesses 12.

Thus, the central fulcrum portion of the conventional pressure pad device as exemplified by three embodiments as described above is of a type such that one of more projections or one or more recesses are formed in the microcassette and the leaf spring, and one member is confined by inserting the projections into the recesses of the other member. In preparation of these members, it has been essentially necessary for these member to have allowances with the result that it has not been possible to eliminate a clattering movement of the leaf spring in the lateral direction. Namely, gaps P are necessarily produced between the supporting member 6 and the projecting pieces 4, 4' extending along both sides of the supporting member 6 as shown in FIG. 2. In case as shown in FIG. 3, gaps P are produced between the enlarged portion 10 of the leaf spring 2 and the protrusions 11. In the embodiment of FIG. 4, gaps P are produced between the inner sides of the recess 12 of the enlarged portion and the protrusion 13.

Presence of such gaps cause deflection in position of the pad with respect to the magnetic head and accordingly, a pad pressure is changed to thereby cause adverse affect to characteristic such as output variation, phase difference etc. Since support of the leaf spring is unstable at the central fulcrum portion, a vibration is induced in the pad during running of the magnetic tape to undesirably cause, for instance, wowflutter, creaking of the magnetic tape as well as reduction of the characteristics described above. While various improvements in magnetic materials for magnetic tapes and running characteristic of the tape as well as magnetic tapes having a high performance have been developed, stability of the function of the pad is also required.

SUMMARY OF THE INVENTION

It is an object of the present invention to provide a pressure pad device for a magnetic tape cassette which is provided with a central fulcrum portion for inhibiting a clattering movement and vibration.

The foregoing and other objects of the present invention have been attained by providing a pressure pad device for a magnetic tape cassette comprising a leaf spring having a central fulcrum portion, left and right side portions extending symmetrically from the central fulcrum portion, and each pad attached to near each end of the left and right side portions so as to be equidistant from the central fulcrum portion, wherein a fitting hole is formed at the central fulcrum portion by bending a plurality of strip zones formed in the central portion of the leaf spring inwardly and outwardly, the fitting hole is adapted to receive a supporting pole of the magnetic tape cassette and each end of the left and right side portions of the leaf spring is flexibly in contact with each pin of the magnetic tape cassette.

BRIEF DESCRIPTION OF THE DRAWINGS

The foregoing object, other object as well as specific embodiment of the pressure pad device of a magnetic tape cassette of the present invention will be more apparent and understandable from the following detailed description thereof, when read in connection with preferred embodiments as well as the accompanying drawing.

FIG. 1 is a plan view showing the inside of the conventional micromagnetic tape cassette;

FIG. 2 is an enlarged view of the pressure pad device in FIG. 1;

FIGS. 7(a) and 7(d) are schematic views showing variety of the combination of a fitting hole and a supporting pole.

DETAILED DESCRIPTION OF THE PREFERRED EMBODIMENTS

Figure 3A:
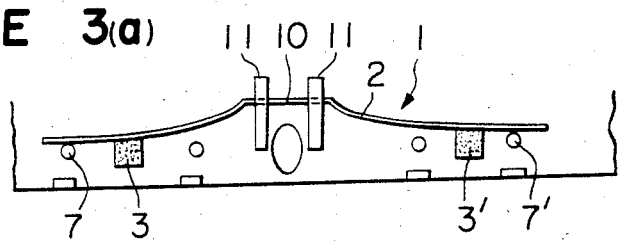
FIGS. 3(a) and 3(b) are respectively plan view and front view of another example of the conventional pressure pad device.
Figure 3B:
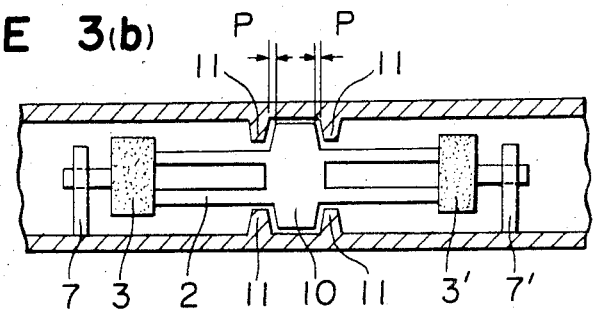
Figure 4A:
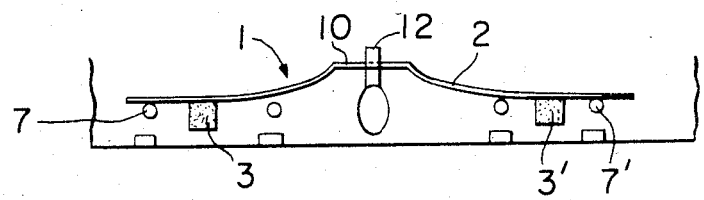
FIGS. 4(a) and 4(b) are respectively plan view and front view of still another example of the conventional pressure pad device.
Figure 4B:
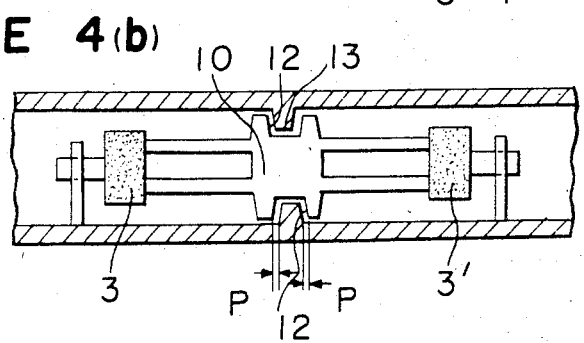
Figure 5A:
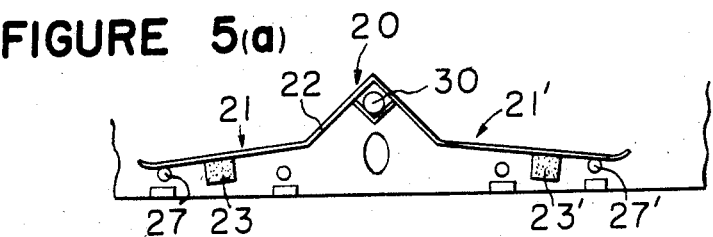
FIGS. 5(a) and 5(b) are respectively plan view and front view of an embodiment of the pressure pad device of the present invention.
Figure 5B:
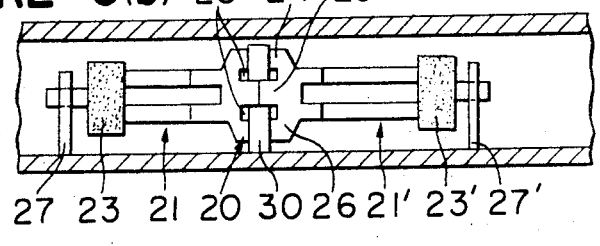
Figure 6:
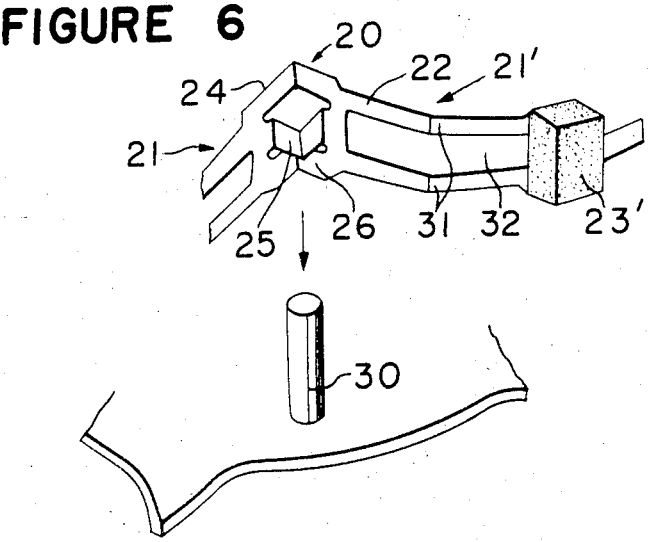
FIG. 6 is an exploded perspective view partly omitted of the pressure pad device.

A preferred embodiment of the pressure pad device of the present invention will be described with reference to FIGS. 5(a), 5(b) and FIG. 6.

A pressure pad device of the present invention is formed of a central fulcrum portion 20, a leaf spring having left and right side portions 21, 21' extending opposite each other from the central fulcrum portion in a symmetrical manner and each pad 23 or 23' attached to near each end of the left and right side portions 21, 21'. The central fulcrum portion 20 receives a supporting pole 30 as described below. Each end of the left and right side portions 21, 21' is flexibly in contact with each supporting pin 27 or 27'.

In accordance with the present invention, a fitting hole adapted to receive a supporting pole 30 therein is formed in such a manner that a plurality of slits or slots formed in the longitudinal direction of the leaf spring 22 at its central fulcrum portion 20 to provide a plurality of strip zones and each of the strip zones is alternately bent inwardly and outwardly with respect to the surface of the leaf spring in a V or an invert V shape. In FIGS. 5 and 6, three strip zones 24, 25, 26 are formed with an equal width by means of two slots 28 and each of the strip zones 24, 25, 26 is alternately bent inwardly and outwardly in a V shape or an invert V shape so that a fitting hole having, as a whole, a diamond or nearly square shape in cross section is formed in the width direction of the leaf spring. The strip zones 24 and 26 are bent toward the inside of the cassette and the strip zone 25 between the zones 24 and 26 is bent toward the outside whereby a fitting hole having a cross section of a nearly square shape is realized and the supporting pole 30 is inserted into the fitting hole as shown in FIG. 6.

It is desirable for the central fulcrum portion 20 to have a width greater than those of the left and right side portions to increase stability for support. However, it is possible to make the width of the central fulcrum portion and the left and right side portions substantially equal. Furthermore, in the embodiment shown in the drawing, the strip zones are formed with an equal width by means of the slots 28. However, the strip zones may be contiguously formed by slitting the leaf spring. The number of strip zones can be optional if difficulty in preparation is disregarded. It seems the central fulcrum portion having three strip zones is the best as shown in the drawing. In this case, it is desirable that the width of the central strip zone 25 is slightly greater than those of the strip zones 24, 26 in order to give a good stability.

The strip zones 24, 25, 26 can be bent to have a desired shape in cross section. It is, however, optimum that they are bent in a V shape and an inverted V shape if the supporting pole 30 having a circle in cross section is used.

Figure 5C:
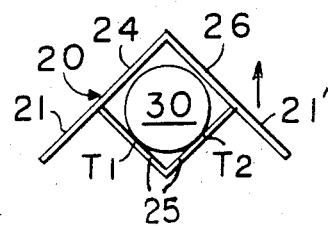
FIGS. 5(c) and 5(d) are enlarged plan views of the central fulcrum portion of the pressure pad device according to the present invention.

When the pressure pad device having the construction described above is assembled in a cassette, both ends of the leaf spring are forced against the supporting pins 27, 27' with the result that the central fulcrum portion 20 is deflected toward the inside of the cassette as shown by the arrow mark in an enlarged view of FIG. 5(c). As a result, the inner walls of the central strip zone 25 which is bent toward the outside of the cassette are brought into point-contact with the supporting pole 30 at points $T_1$, $T_2$ in the plan view. Thus, the point-contact between the supporting pole 30 and the inner walls of the strip zone eliminates the clattering movement of the pad in the left and right directions and improves stability for supporting the leaf spring remarkably, the leaf spring is firmly supported by means of the supporting pole 30 (at the contact point $T_1$) and the supporting pin 27 on the left side and by means of the supporting pole 30 (at the contact point $T_2$) and the supporting pin 27' on the right side under the condition of inhibiting clattering movement. The contact points $T_1$, $T_2$ take substantially the same positions. Even though the contact points are shifted by any cause, they return the original positions due to its self-recovery function.

Figure 5D:
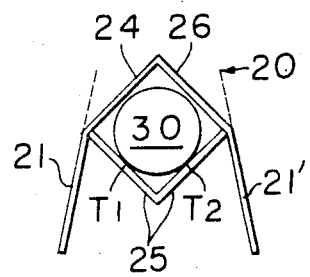

It is preferable that the surfaces of the strip zones 24, 26 which are bent toward the inside of the cassette are respectively located on the extension lines of the left and right side portions 21, 21', because the steps of preparation of the leaf spring become simple. Namely, the strip zones 24, 26 are bent with the left and right side portions in a linear form by bending the leaf spring at the center of the strip zones and it is enough to bend only the central strip zone 25. FIG. 5(c) shows that the surfaces of the strips zones 24, 26 are located on the extension lines of the surfaces of the left and right side portions 21, 21' of the leaf spring. FIG. 5(d) shows the surfaces of the strip zones which are located out of the extension lines. The same function can be obtained in the embodiment as shown in FIG. 5(d).

FIG. 7 shows schematically several combinations of the supporting pole and the fitting hole.

The left and right side portions of the leaf spring are made extended in suitable positions in such a manner that the pad 23, 23' are regularly positioned with respect to the surface of a magnetic tape depending on a positional relationship of the supporting pole 30 and the supporting pins 27, 27' and an adequate pressure of the pad is given to the magnetic tape. At least one bent portion is formed in each of the left and right side portions. In FIG. 6, a bent portion 31 is formed in the intermediate portion between the pad and the central fulcrum portion. An opening 32 is formed in each of the left and right side portions between the pad and the central fulcrum portion. It is, however, possible to modify the construction of the leaf spring so as to determine these side portions at a suitable position and to give a correct pressure of the pad.

As described above, since the pressure pad device of the present invention is so constructed as to inhibit clattering movement of the pad in the lateral direction, the pad is immovable with respect to the position of a magnetic head, a stabilized pressure of the pad is provided and characteristics such as output variation, phase difference etc. are remarkably improved in comparison with the conventional device. Similarly, vibration of the pad during running of the magnetic tape is quite small and accordingly troubles such as wowflutter, creaking of the magnetic tape are also eliminated.

The pressure pad device of the present invention has a relatively independent supporting structure for the left and right side portions because each of the left and right side portions of the leaf spring is supported between the contact point $T_1$ and the supporting pin 27 or between the contact point $T_2$ and the supporting pin 27'. A three head system has been developed for microcassette recorders to provide a structure such that a reproducing head and a recording head are separately provided so that when a microcassette is set in a recorder, each of pads is simultaneously opposed to each of the heads. In this case, it is necessary that one of the pads does not influence the other. In the pressure pad device of the present invention, the pads are supported independent of each other and accordingly, it can be easily adapted to the three head system.

We claim:

1. A pressure pad device for a magnetic tape cassette comprising a leaf spring having a central fulcrum portion, left and right side portions extending symmetrically from the central fulcrum portion, and a pair of pads, one of said pads being attached on each of the left and right side portions so as to be equidistant from the central fulcrum portion, wherein a fitting hole is formed at the central fulcrum portion by bending alternately a plurality of strip zones formed in the central fulcrum portion of said leaf spring in opposed directions so as to matingly engage a central supporting pole in the magnetic tape cassette, said fitting hole being adapted to receive said supporting pole of said magnetic tape cassette; and wherein each end of said left and right side portions of said leaf spring is flexibly in contact with a supporting pin of said magnetic tape cassette.

2. A pressure pad device according to claim 1 wherein the surfaces of said strip zones which are bent at the central fulcrum portion toward the inside of said magnetic tape cassette are in line with the surfaces extended from said left and right side portions.

3. A pressure pad device according to claim 1 wherein the width of said central fulcrum portion is greater than the width of said left and right side portions.

4. A pressure pad device according to claim 1 wherein three strip zones are formed in the central fulcrum portion and the width of the central strip zone is greater than that of any other strip zone.

5. A pressure pad device according to claim 1 wherein said strip zones are alternately bent in a V shape and an inverted V shape so that a fitting hole having a diamond or nearly square shape in cross section is formed.

6. A pressure pad device according to claim 1 wherein three strip zones are formed in the central fulcrum portion and the central strip zone is bent toward the outside of said magnetic tape cassette and the other strip zones are bent toward the inside thereof.

* * * * *